(12) United States Patent
Edvardsson et al.

(10) Patent No.: US 8,350,751 B2
(45) Date of Patent: Jan. 8, 2013

(54) RADAR LEVEL GAUGE WITH IMPROVED RADAR WINDOW

(75) Inventors: Olov Edvardsson, Linköping (SE); Stig Larsson, Sävedalen (SE)

(73) Assignee: Rosemount Tank Radar AB, Gothenburg (SE)

( * ) Notice: Subject to any disclaimer, the term of this patent is extended or adjusted under 35 U.S.C. 154(b) by 338 days.

(21) Appl. No.: 12/721,072

(22) Filed: Mar. 10, 2010

(65) Prior Publication Data

US 2011/0221629 A1 Sep. 15, 2011

(51) Int. Cl.
*G01S 13/08* (2006.01)

(52) U.S. Cl. .................. 342/124; 73/290 R; 73/1.31

(58) Field of Classification Search .............. 342/124
See application file for complete search history.

(56) References Cited

U.S. PATENT DOCUMENTS

| | | | | |
|---|---|---|---|---|
| 4,670,754 | A | 6/1987 | Zacchio | 324/124 |
| 5,594,449 | A * | 1/1997 | Otto | 342/124 |
| 6,325,391 | B1 | 12/2001 | Smith et al. | 277/650 |
| 6,606,904 | B2 * | 8/2003 | Muller et al. | 73/290 V |
| 7,586,450 | B2 * | 9/2009 | Muler | 343/703 |
| 2007/0296626 | A1 * | 12/2007 | Gnedenko et al. | 342/124 |

FOREIGN PATENT DOCUMENTS

| | | |
|---|---|---|
| DE | 4407823 | 3/1994 |
| DE | 4407823 A1 * | 9/1995 |
| DE | 19617963 | 5/1996 |

OTHER PUBLICATIONS

Written Opinion of the International Searching Authority for PCT/EP2011/053471, international filed Mar. 8, 2011, date of mailing Jun. 30, 2011, 6 pages.
International Search Report for PCT/EP2011/053471, international filed Mar. 8, 2011, date of mailing Jun. 30, 2011, 3 pages.

* cited by examiner

*Primary Examiner* — Timothy A Brainard
(74) *Attorney, Agent, or Firm* — Westman, Champlin & Kelly, P.A.

(57) ABSTRACT

A radar level gauge for determining the filling level of a product in a tank, comprising a transceiver for transmitting and receiving microwaves, processing circuitry connected to the transceiver and adapted to determine the filling level, an antenna connected to said transceiver and arranged to emit and receive microwaves through an opening of the tank, and a microwave transmissive sealing member adapted to cover said opening and to provide pressure sealing of the tank. The sealing member comprises a metal grid layer providing structural strength, which metal grid layer has sealed openings formed to allow transmission of microwaves.
The tank opening is thus divided into a number of smaller openings by the metal grid, thereby improving the mechanical strength of the sealing member. At the same time, the sealing member is designed to maintain its pressure sealing properties, e.g. by suitable dielectric filling of the openings.

12 Claims, 4 Drawing Sheets

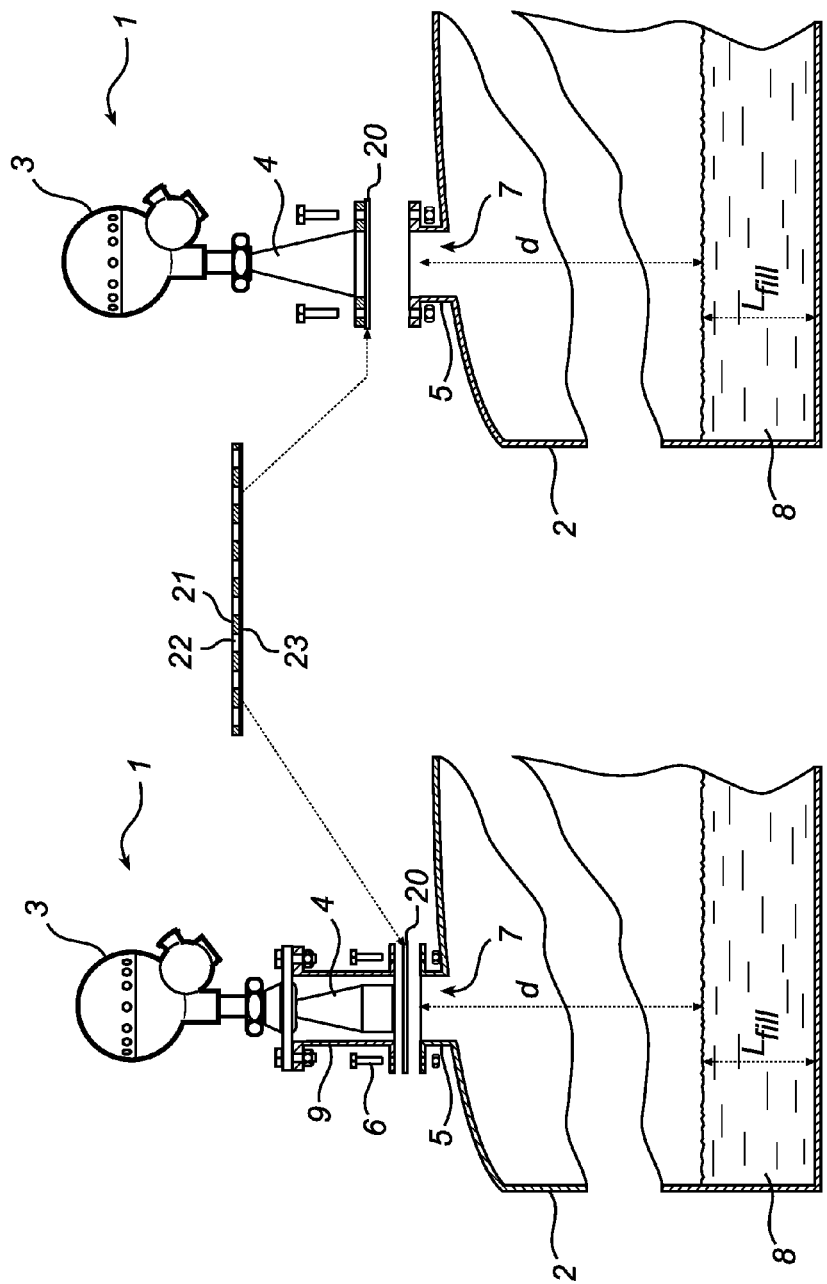

RADAR LEVEL GAUGE WITH IMPROVED RADAR WINDOW

FIELD OF THE INVENTION

The present invention relates to a radar level gauge system using electromagnetic waves for measuring a level of a surface of a product in a container.

BACKGROUND OF THE INVENTION

Radar level gauges (RLGs) are suitably used for making non-contact measurements of the level of products such as process fluids, granular compounds and other materials contained in a tank. An example of such a radar level gauge can include a transceiver for transmitting and receiving microwaves, an antenna arranged to direct microwaves towards the surface and to return microwaves reflected by the surface to the transceiver, and processing circuitry adapted to determine the level based on a relation between microwaves transmitted and received by the transceiver.

In some applications, the antenna is mounted inside the tank and is exposed to the tank contents and environment. However, in some cases it is desirable to insulate the RLG and its antenna from the tank contents. For example, it may be advantageous to provide a smooth surface towards the tank interior, thus avoiding contamination of hidden compartments present in a complex structure such as an antenna.

A challenge with such a design, however, is that it requires an opening in the tank corresponding to the antenna cross section, typically in the range of 50-400 mm. The size of the opening can be a mechanical problem, if the opening has to withstand high pressure, especially if the temperature is high enough to cause an insulating material covering at least a part of the antenna opening to lose some of its strength.

Several solutions are known to address these problems. According to one of these solutions, a radome (also referred to as window seal or radar window) is arranged below the antenna. An example of such a radome is given in U.S. Pat. No. 6,325,391 to Smith et al., where a window seal is arranged at an interface between a flange of the tank and a standoff pipe. A radar gauge is mounted on the standoff pipe, so that the antenna extends into the pipe, with its opening just above the window seal. The window seal is formed as an inverted cone made of PTFE, and is thick enough to withstand the pressure of the tank.

However, in some applications the pressure in the tank exceeds that which the PTFE window seal disclosed in U.S. Pat. No. 6,325,391 can withstand, in particular when the temperature is high. There is thus a need for an improved solution, which can withstand even higher pressure.

GENERAL DISCLOSURE OF THE INVENTION

It is an object of the present invention to provide a radar window that can withstand higher pressure than conventional solutions.

This and other objects is achieved with a radar level gauge comprising a transceiver for transmitting and receiving microwaves at an operation frequency, processing circuitry connected to the transceiver and adapted to determine the filling level based on a relation between microwaves transmitted and received by the transceiver, an antenna connected to the transceiver and arranged to emit and receive microwaves through an opening of the tank, a microwave transmissive sealing member adapted to cover the opening and to seal the tank, the sealing member comprising a metal grid layer providing structural strength, the metal grid layer having sealed openings formed to allow transmission of microwaves.

According to the present invention, the tank opening is thus divided into a number of smaller openings by the metal grid, thus improving the mechanical strength of the sealing member. At the same time, the sealing member is designed to maintain its pressure sealing properties, e.g. by a dielectric cover or suitable dielectric filling of the openings.

The metal grid is formed so as to minimize its influence on the radar transmission and the antenna pattern. Even if the total cross section of the openings is a small portion of the total cross section of the sealing member (such as 10%), the design of the openings can be such as to provide almost full microwave transparency in a typical frequency band for radar level gauging. One way to achieve this is to form the openings to have a resonance frequency equal to said operation frequency.

With the same thickness and material of the insulation material over the openings, the maximum pressure will increase in inverse proportion to the surface of the opening. In other words, a large number of openings (sealed by a suitable material) will withstand a significantly larger pressure than one large opening (sealed by the same material). By careful design a plurality of small openings (e.g. more than 10 openings), with a total area that is only a small fraction, e.g. 10-20%, of the total area of the sealing member, may allow close to 100% transmission and very low reflection of microwaves in a specified frequency range.

According to one embodiment, the sealing member may comprise a dielectric layer facing the interior of the tank, fully covering the surface of the metal grid to thereby avoid hidden spaces exposed to the antenna atmosphere.

In case of approval for use explosive atmosphere the metallic grid will also serve as an equalizer for electrostatic discharge, as long as any dielectric layer covering the metal grid is not too thick. For a conventional sealing member, the possible size of the opening is severely limited (such as 20 cm$^2$) to limit the accumulation of electric charge.

For linear polarization, the metal grid can comprise essentially parallel $\lambda/2$-slots. By suitable spacing between the slots, the transmission can be close to 100%. Further, the metal grid may comprise metal strips which can be straight or preferably slightly bent to essentially follow the magnetic field lines over the sealing member surface.

If the polarization is circular or changeable the sealing member must have similar transmission properties for two or more polarizations. In this case, the openings in the metal grid are preferably 90, degrees or 120 degrees symmetrical. For example, the openings may be circular or crosshaped.

The thickness of the sealing member may further be chosen to vary across its surface to thereby obtain a lens effect. Such a lens effect may simplify the antenna design (i.e. using of a shorter horn) above the sealing member.

The sealing member can be integrated with the antenna and or be a separate metal reinforced radar window which can be combined with many types of antennas.

BRIEF DESCRIPTION OF THE DRAWINGS

FIGS. 1 and 2 schematically illustrate a radar level gauge mounted to a tank.

DETAILED DESCRIPTION OF CURRENTLY PREFERRED EMBODIMENTS

Figure 3:
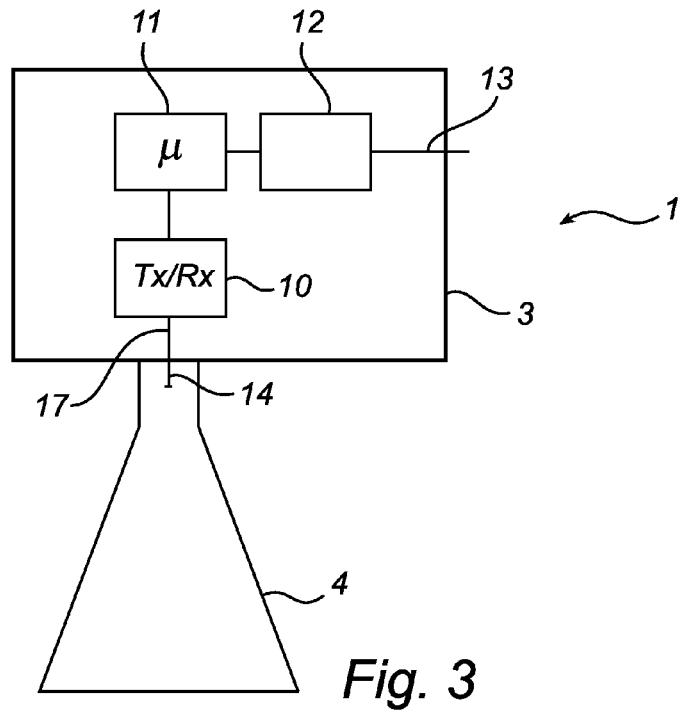
FIG. 3 schematically illustrates the electronics unit in FIG. 1 in more detail.

FIGS. 1 and 2 schematically illustrate a radar level gauge (RLG) 1 mounted to a tank 2. The RLG 1 comprises a measurement electronics unit 3 and an antenna 4. The radar level gauge system 1 is mounted on a flange 5 of the tank 2, by bolts 6 or any other means considered appropriate for the current conditions. The RLG 1 is thereby secured on top of a tank opening 7, in a measuring position fixed relative the bottom of the tank 2.

The RLG 1 is arranged to determine the distance d between a reference position and an interface between different materials in the tank, by transmitting signals into the tank, receiving signals reflected from the tank, and analyzing a relationship between transmitted and received signals.

This distance d may be used to perform measurements of a process variable in the tank 2, such as the filling level $L_{FILL}$ of a filling material 8 in the tank 2. Typically, the material 8 is a liquid content stored in the tank, e.g. oil, refined products, chemicals and liquid gas, but it may also be a solid material in powder form or granulate, such as grain or pellets.

Note that different materials have different impedance, and that the electromagnetic waves will only propagate through some materials in the tank. Typically, therefore, only the level of a first interface is measured, or a second interface if the top material is sufficiently transparent.

As is schematically illustrated in FIG. 3, the electronics unit 3 comprises a transceiver 10 for transmitting and receiving electromagnetic signals and a processing unit 11, which is connected to the transceiver 10 for control of the transceiver and processing of signals received by the transceiver for determination of the filling level $L_{FILL}$ of the product 8 in the tank 2. The transceiver 10 may be one functional unit capable of transmitting and receiving electromagnetic signals, or may be a system comprising separate transmitter and receiver units. The processing unit 11 is connectable to external communication lines 13 for analog and/or digital communication via an interface 12. Moreover, although not shown in FIG. 3, the radar level gauge system 1 is typically connectable to an external power source, or may be powered through the external communication lines 13. Alternatively, the radar level gauge system 1 may be configured to communicate wirelessly.

The distribution of the microwave signal between measurement electronics unit 3 and the antenna 4 may, as shown in FIG. 3, be accomplished by means of a transmission line 17. This transmission line 17 is preferably provided by means of a coaxial wire, but may likewise be provided by any appropriate wave guide. Coaxial lines, micro strip lines, strip lines or other TEM-lines inherently have wideband functionality and can be used. Furthermore, in the case of a plurality of frequency bands, separate transmission lines 17, e.g. coaxial wires, may be utilized for the different bands. The transmission line is connected to a probe 14 acting as an interface between the transmission line and the medium in the tank. The antenna 4 serves to direct the freely propagating microwaves in a direction towards the surface of the material 8.

The tank opening 7 is covered by a sealing member 20, also referred to as a radar window. The sealing member is essentially disc shaped, and is large enough to cover the tank opening 7. It may extend outside the flange 5 to avoid hidden spaces. The sealing member 20 provides a gas tight sealing capable of withstanding temperature, pressure, and any chemicals contained in the tank, while at the same time being able to transmit microwaves emitted from the antenna, and reflected from the tank.

The sealing member 20 comprises a metal plate 21, e.g. made of steel, with a large number of essentially equal openings or through holes 22 having a shape and size matched to the frequency band used by the RLG. Over a limited frequency band the metal plate will appear fully transparent, as is described in "Frequency selective surfaces" by Ben A Munk (John Wiley 2000).

As explained in the book by Munk, the holes should preferably have a resonant function (such as a $\lambda/2$-slot or two crossed such slots), and a suitable grid spacing (generally in the range $\lambda/2$-$\lambda$) to achieve a transmission close to 100% of microwaves at the resonance frequency.

The spacing of the openings 22 is important for the transparency of the plate, but each opening 22 is preferably rather narrow, in order to maintain the structural strength of the plate 21. The spacing between the openings can be around $3\lambda/4$, which is 4 cm at 6 GHz and 1 cm at 26 GHz. The openings can be dimensioned to fit the frequency and their diameter can typically be $\lambda/2$ in the material filling the opening. The metal plate 21 may suitably have a thickness of $\lambda/2$ in the material filling the opening, but a thicker plate (such as n $\lambda/2$) may be used too.

The sealing member can be mounted inclined in relation to the horizontal plane, in order to avoid accumulation of condensation. It may also have be formed to avoid any flat horizontal surface, for example it may be a vaulted or conical.

Further, the metal plate 21 may be covered with a layer 23 of PTFE, PPS or other suitable plastic material. The coating may extend over the edges of the mounting flange 5, so that the tank atmosphere is exposed only to the coating layer.

In FIG. 1, the sealing member 20 is arranged in an annular interface between the flange 5 and a tubular flange extension 9. The RLG is then mounted on the flange extension, so that the antenna 4 extends down into the flange extension, with the antenna horn facing the upper surface of the sealing member. With this design, the RLG 1 can be removed and replaced without removing the sealing member, and thus without opening the tank. The sealing member 20 may be adapted to match different types of antennas.

In FIG. 2, the sealing member is mounted to the flange 5 simultaneously with the antenna 4. With this design, removal/replacement of the RLG will require opening of the tank. As shown in FIG. 2, the sealing member 20 may be formed integrally with the antenna, which may be preferred when the sealing member is specifically adapted to match a certain antenna.

Figure 4:
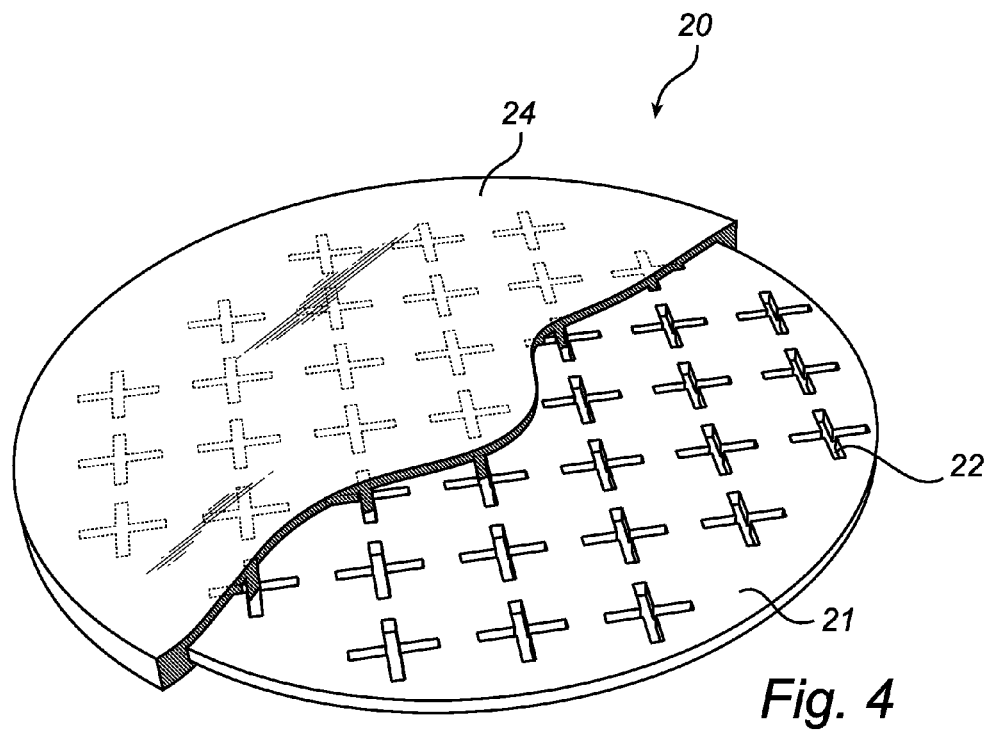
FIG. 4 illustrates a first example of a radar window.

FIG. 4 illustrates a first example of a radar window 20a. According to this embodiment, the metal plate 21 is molded in a plastic material such as PTFE 24 which fills the openings 22 and creates a protective surface at least on the side facing the tank interior, and possibly on both sides. As an alternative, a plate of e.g. PTFE is ejection molded with a surface topology matching the openings in the metal plate 21.

The openings 22 of the sealing member on FIG. 4 may be of any shape. In the illustrated example the openings 22 are cross shaped, which will allow microwaves of different polarization to be transmitted through the plate 21.

Figure 5:
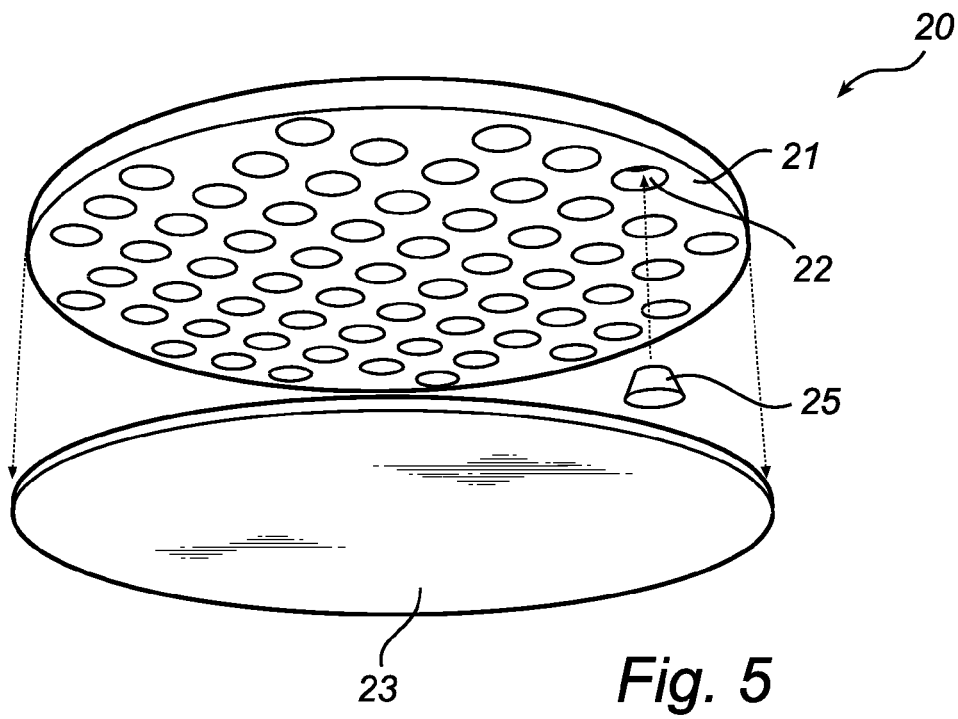
FIG. 5 illustrates a second example of a radar window.

FIG. 5 illustrates a second example of a radar window 20b, which is suitable for withstanding greater pressure, especially at high temperatures, where plastic materials such as PTFE become deformable. In this example, the holes are slightly upwards tapered, and filled with filling elements 25 made of a hard, non-conductive, temperature resistant material, such as ceramic. In the illustrated example, the holes are conical, and the filling elements have the shape of matching conical plugs. Below the steel plate a polymer sheet of e.g. a plastic material such as PTFE, serves as a sealing towards the tank and also as to secure the plugs.

When the sealing member 20b is exposed to pressure within the tank, the entire surface of the polymer sheet will be supported by the metal plate 21 and the filling elements 25, and be protected against deformation. The filling elements 25 will pressed against the inner walls of the tapered holes, but cannot be dislocated.

Figure 6:
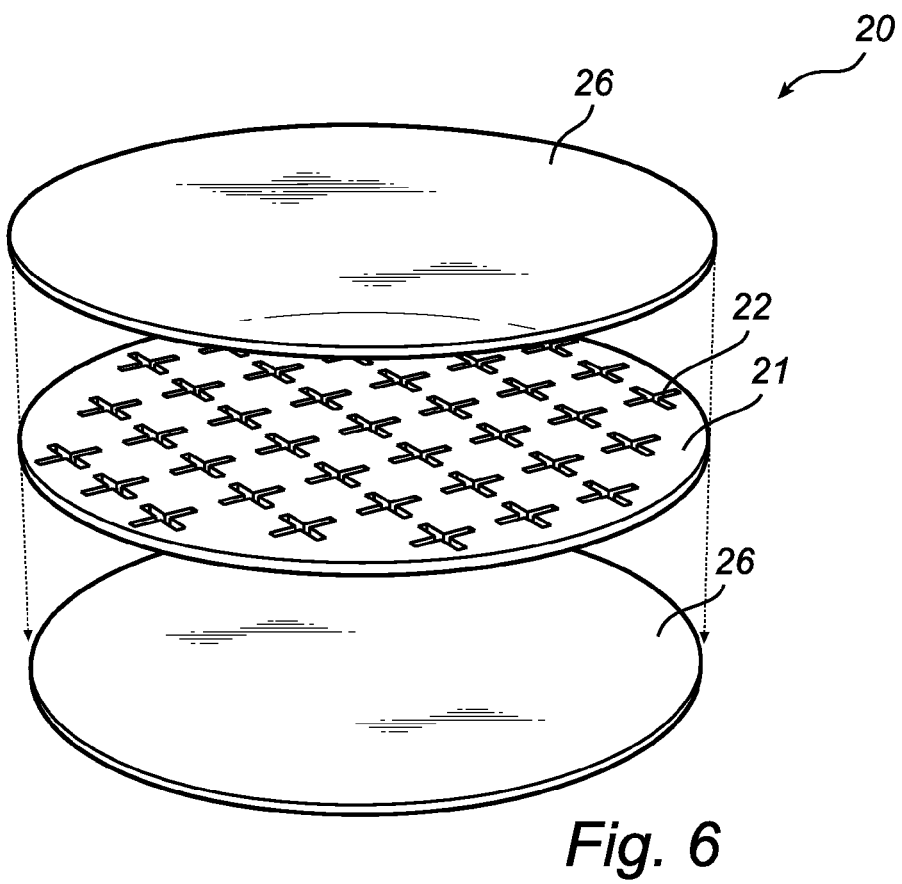
FIG. 6 illustrates a third example of a radar window.

FIG. 6 illustrates a third example of a radar window 20c. In this case, the perforated metal plate 21 is sandwiched between two plates 26 of a harder polymer material, such as PPS. The plates 26 will withstand the pressure from the tank, and the openings 22 in the plate 21 do not need to be filled.

Figure 7:
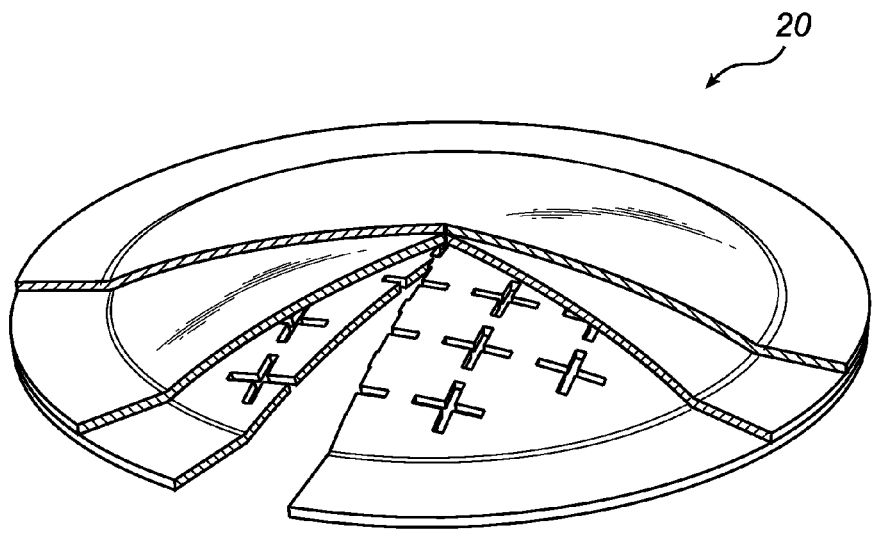
FIGS. 7 and 8 illustrate a sealing member with a conical or vaulted shape.
Figure 8:
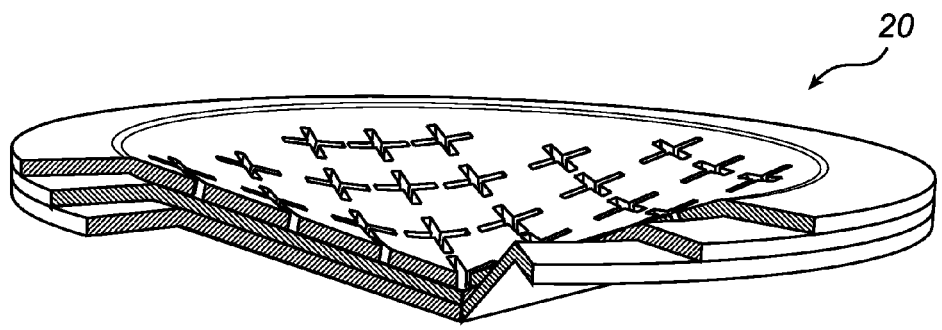

In some applications, there may be a tendency for liquid tank content to stick to the sealing member surface facing the tank interior, thereby impairing microwave performance. To avoid this, the sealing member 20 may have a conical or vaulted shape, as illustrated in FIGS. 7 and 8, to promote drainage of liquid residue from the sealing member. The protrusion (e.g. cone or vault) may point away from (FIG. 7) or towards (FIG. 8) the interior of the tank.

The person skilled in the art realizes that the present invention by no means is limited to the examples described above. On the contrary, many modifications and variations are possible within the scope of the appended claims. For example, other designs of sealing members are possible, where the openings of a metal grid are sealed so as to enable pressure sealing. Also, the mounting of the sealing member to the tank may be different, and include suitable connection means, securing means, fasteners and adaptors. It may also be advantageous to provide microwave matching between the antenna and the sealing member, in cases where such matching is not already provided by the sealing member. Further, the sealing member may have a varying thickness over its cross section, in order to provide a lens function. For example, the sealing member may be formed to focus or redirect the microwave radiation when it passes through the sealing member.

What is claimed is:

1. A radar level gauge for determining the filling level of a product in a tank, said radar level gauge comprising:
    a transceiver for transmitting and receiving microwaves in an operation frequency band,
    processing circuitry connected to the transceiver and adapted to determine the filling level based on a relation between microwaves transmitted and received by the transceiver,
    an antenna connected to said transceiver and arranged to emit and receive microwaves through an opening of the tank,
    a microwave transmissive sealing member adapted to cover said opening and to provide pressure sealing of the tank,
    said sealing member comprising a metal grid layer providing structural strength, said metal grid layer having sealed openings formed to allow transmission of microwaves,
    wherein said openings are formed to have a resonance frequency in said operation frequency band.

2. The radar level gauge according to claim 1, wherein said openings are sealed by a dielectric layer facing the interior of the tank and covering said openings.

3. The radar level gauge according to claim 1, wherein each opening is sealed by a sealing element arranged in said opening.

4. The radar level gauge according to claim 1, wherein each opening is a $\lambda/2$-slot, where $\lambda$ is the wavelength of emitted microwaves in a material filling the opening.

5. The radar level gauge according to claim 1, wherein the metal grid layer has more than ten openings.

6. The radar level gauge according to claim 1, wherein the openings have a total cross section area corresponding to less than 20% of a cross section area of the sealing member.

7. The radar level gauge according to claim 1, wherein the openings in the metal grid are 90°-symmetrical to allow transmission of microwaves of any polarization.

8. The radar level gauge according to claim 1, wherein the openings in the metal grid are 120°-symmetrical to allow transmission of microwaves of any polarization.

9. The radar level gauge according to claim 1, wherein the sealing member is adapted to allow transmission of microwaves in two widely separated frequency bands.

10. The radar level gauge according to claim 1, wherein the thickness of the sealing member is chosen to vary across its surface to thereby obtain a lens effect.

11. The radar level gauge according to claim 1, wherein the sealing member is integrated with the antenna.

12. The radar level gauge according to claim 1, wherein the metal grid layer comprises strips arranged to essentially follow the magnetic field lines over the sealing member surface.

* * * * *